United States Patent [19]

O'Dell

[11] 4,306,896
[45] Dec. 22, 1981

[54] FILTER BAG ANCHORING ARRANGEMENT

[75] Inventor: Leonard J. O'Dell, Louisville, Ky.

[73] Assignee: American Air Filter Company, Inc., Louisville, Ky.

[21] Appl. No.: 202,880

[22] Filed: Nov. 3, 1980

[51] Int. Cl.³ ............................................. B01D 46/02
[52] U.S. Cl. .................................. 55/341 R; 55/379; 55/484; 55/491; 55/492; 55/493; 55/509
[58] Field of Search ............. 55/341 R, 374, 378–379, 55/422, 484, 491–493, 504, 509, 341 HM

[56] References Cited

U.S. PATENT DOCUMENTS

| 1,843,639 | 2/1932 | Hansen | 55/341 R X |
| 1,944,407 | 1/1934 | Dahlman | 55/493 X |
| 2,162,043 | 6/1939 | Westlund et al. | 55/379 X |
| 3,243,943 | 4/1966 | Getzin | 55/509 X |
| 3,813,853 | 6/1974 | Anderson | 55/379 X |
| 3,888,644 | 6/1975 | Holland et al. | 55/492 X |
| 4,073,632 | 2/1978 | Reinauer et al. | 55/341 R X |

Primary Examiner—Kathleen J. Prunner
Attorney, Agent, or Firm—Thomas G. Anderson

[57] ABSTRACT

A filter anchoring arrangement for securing the dependent ends of a row of filter bags suspended from a common filter supporting plate in a bag house. The anchoring arrangement includes a gathering member and a retaining member cooperating with the gathering member to align and retain a docking pin projecting from the dependent end of each bag upon rotation of the gathering and retaining members into a bag-anchoring position.

9 Claims, 5 Drawing Figures

FILTER BAG ANCHORING ARRANGEMENT

BACKGROUND OF THE INVENTION

1. Field of the Invention

The present invention relates to gas separation devices and, in particular, to a filter anchoring arrangement in a bag house.

2. Description of the Prior Art

The prior art includes a variety of tubular filter arrangements for removing particulates from a dirty gas stream flowing through a bag house. Typically, a plurality of tubular filter bags are suspended from a tube sheet or filter supporting plate which divides the bag house into a dirty gas chamber and a clean gas chamber, and a basket or cage is provided within each of the filter bags to prevent its collapse or failure during use. When this type of arrangement is used to support the longer 12-14 foot filter bags, experience has shown that the filter bags tend to swing or sway on the tube sheet during normal filtering operations. This causes the lower ends of the bags to bump into one another with a chopping-like effect resulting in wear and abrasion to the filtering media of the bags. While this has generally not been a serious problem in bag houses using fabric or felt bags, fiberglass bags, such as those provided in the bag houses used to clean the hot flue gases of an electrical power plant, are particularly susceptible to this type of damage.

SUMMARY OF THE INVENTION

The present invention relates to gas separation devices and, in particular, to a filter anchoring arrangement for securing the dependent ends of a row of filter bags suspended from an apertured filter supporting plate in a filter housing or bag house.

The anchoring arrangement includes a gathering member and a retaining member rotatably supported within the bag house and extending across its interior beneath each row of filter bags. The gathering member includes a plurality of adjacent, generally V-shaped portions which are adapted to engage a docking pin projecting from the free end of each of the filter bags. This arrangement accommodates guiding the bags into alignment within the bag house upon rotation of the gathering members into a bag anchoring position. After the gathering member is rotated into its bag anchoring position, the retaining member is rotated into engagement with the docking pins to further align and ultimately entrap them within the V-shaped guide portions of the gathering member. When it is desired to disengage the docking pins from the anchoring arrangement, this process is reversed.

From the foregoing, it can be seen that the invention contemplates a convenient and easily fabricated filter anchoring arrangement which substanially reduces abrasion and wear of the filtering medium during filtering operations; however, it is to be understood that various changes can be made in the arrangement, form and construction of the apparatus disclosed herein without departing from the spirit and scope of the invention.

DESCRIPTION OF THE PREFERRED EMBODIMENT

Figures 1, 2, 5:
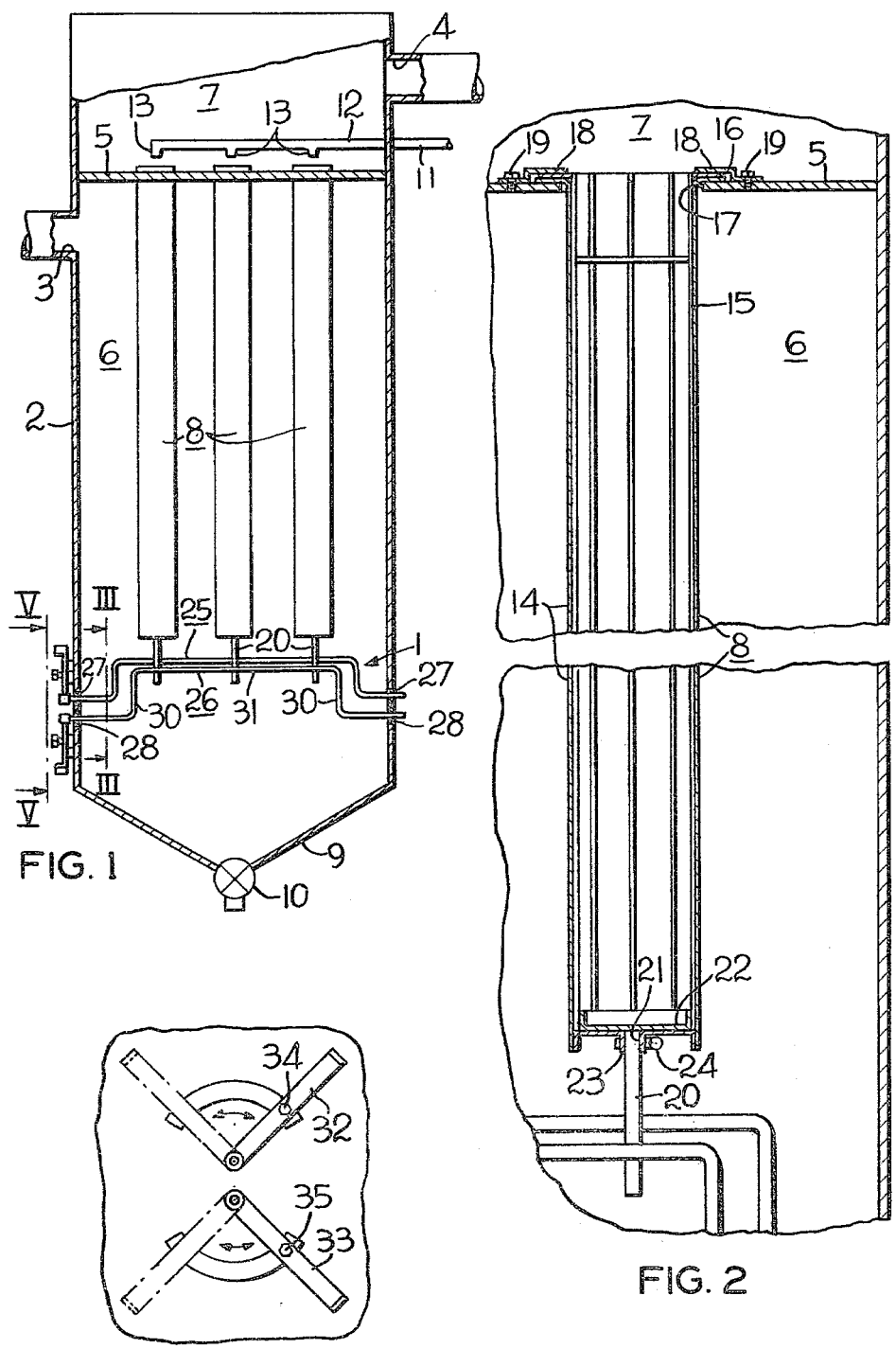
FIG. 1 is an elevational view, partially in section, of a bag house embodying the filter anchoring arrangement of the invention.
FIG. 2 is an enlarged fragmentary view of one of the filter assemblies shown in FIG. 1.
FIG. 5 is an enlarged elevational view taken generally along line V—V in FIG. 1.

As shown in FIG. 1, the gas-cleaning system utilizing the filter anchoring arrangement 1 embodied in the invention inlcudes a filter housing or bag house 2 having a dirty gas inlet 3 and a clean gas outlet 4. The bag house 2 includes a apertured plate or tube sheet 5 which divides the bag house into a dirty gas-cleaning chamber 6 and a clean gas take-off chamber or plenum 7. The tube sheet 5 supports a plurality of tubular filter assemblies 8 within the dirty gas chamber 6, so when dirty gases are directed through the inlet 3 into the cleaning chamber 6, they pass through the filter assemblies 8 and leave the bag house 2 through the plenum 7 and the clean gas outlet 4. Particulate materials separated from the dirty gases are deposited on the exterior of each filter and are collected in a suitable hopper 9 positioned below the dirty gas chamber 6, whereafter these materials are removed from the hopper through the discharge outlet 10 as is well known in the art. To accommodate cleaning of the filters, the bag house includes a valve-controlled, reverse-flow flushing arrangement 11. As shown schematically in FIG. 1, the flushing arrangement 11 includes an inlet pipe 12 connected to a source of compressed air (not shown) which includes injection nozzles 13 positioned above each of the filter assemblies 8 to inject jets or pulses of air into each filter during filter cleaning operations.

Each of the filter assemblies 8 includes a gas-permeable, tubular filter bag or medium 14 and a filter support means in the form of an elongated bag cage or basket 15 extending throughout the length of the bag to prevent its collapse due to the inward flow of gases through the walls of the bag. As shown in FIG. 2, the bag cage 15 includes an upper supporting ring 16 sized to overlie the upper marginal edge of the plate aperture 17. The ring 16 is secured to the tube sheet 5 by a plurality of Z-shaped clamping brackets 18, spaced about the periphery of the ring, which are releasably attached to the tube sheet by machine screws 19 or the like. This accommodates securing the upper end of the filter bag 14 between the ring 16 and the tube sheet 5 to form a dust-tight seal between the filter bag and the tube sheet while also securing the cage within the housing.

As will be described, the filter anchoring arrangement 1 retains the free end of the each filter bag 14 to prevent the bags from bumping into one another as well as to maintain a relatively uniform flow of gases along the entire length of each bag. As shown in FIG. 2, the arrangement entraps a docking pin 20 projecting through a hole 21 in the bottom of each of the filter bags from a base plate 22 forming the bottom of its respective bag cage 15. In this regard, it should be noted that the bottom of the filter bag includes an annular flap or collar 23 formed in the filter media about the hole 21 which is secured in dust-tight sealing relation to the docking pin 20 by a conventional hose clamp 24 or other suitable compression clamp.

Figure 3:
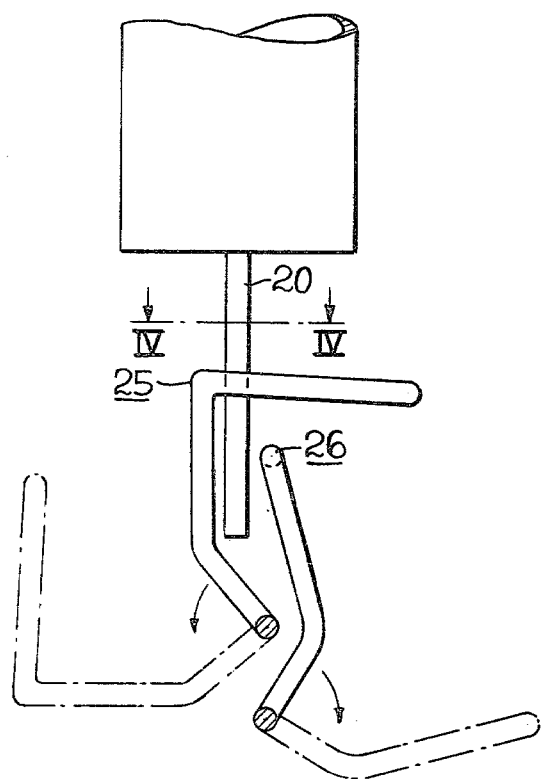
FIG. 3 is an enlarged cross-sectional view of the anchoring arrangement taken generally along line III—III in FIG. 1.
Figure 4:
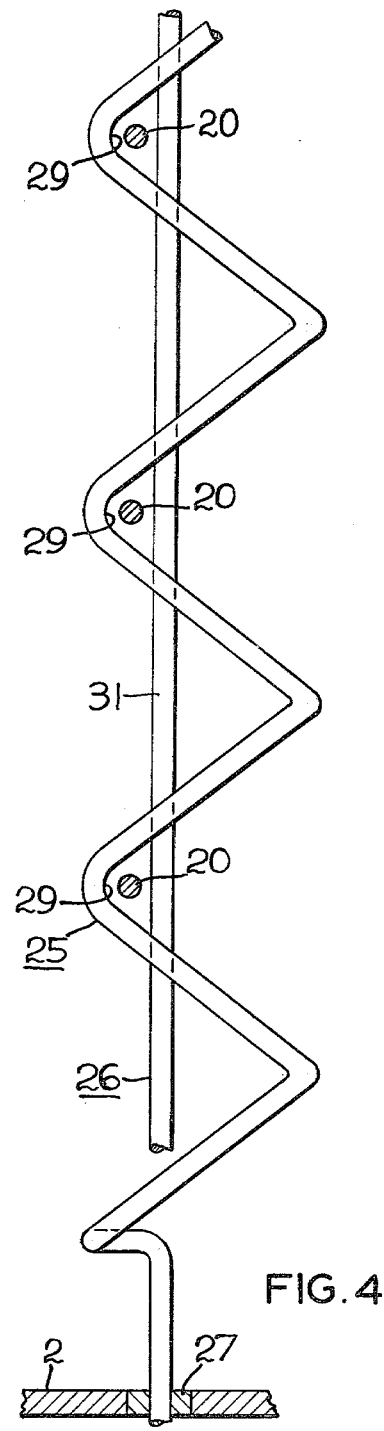
FIG. 4 is a cross-sectional view of the anchoring arrangement taken generally along line IV—IV in FIG. 3.

Referring to FIGS. 3 and 4, the anchoring arrangement includes a gathering means 25 and a retaining member 26 extending across the interior of the bag house beneath each row of filter bags. The ends of the gathering member 25 and the retaining member 26 are journaled within a pair of bearings 27 and 28 mounted on the opposing walls of the bag house so that each member is rotatably supported within the bag house. As shown in the drawings, the gathering member 25 is preferably formed of a rod or bar bent into an elongated, zigzag configuration to provide a series of adjacent, V-shaped notches 29. The retaining member 26 is similarly formed of a rod or bar and includes a pair of crank-arm portions 30 and a straight intermediate section 31. The section 31 extends beneath the entire row of filter bags and is offset from the rotational axis of the retaining member. Additionally, a pair of operating handles 32 and 33 are secured to the ends of the gathering and retaining members on the outside of the bag house. As shown in FIGS. 3 and 5, this accommodates rotation of the members between the disengaged positions shown in phantom lines and the anchoring positions shown in solid lines. In this regard, it should be noted that the operating handles are secured in their respective positions by threaded bolts 34 and 35 releasably securing them to the wall of the bag house.

From the foregoing, it can be seen that when a workman rotates the handle 32 to move the gathering member 25 from its disengaged position into its filter-anchoring position, the member engages the docking pins 20 to align and center the docking pins within each of the notches 29. Thereafter the workman rotates the handle 33 to move the retaining member 26 from its disengaged position into its anchoring position as shown in the drawings. In this regard, it should be noted that as the retaining member is rotated toward its anchoring position, its intermediate section 31 engages the docking pins to further align and ultimately entrap them within the notches 29. The handles are then secured in position with the bolts 34 and 35 and the system is put into operation. Conversely, when it is desired to disengage the docking pins to accommodate replacement of the filter bags, this procedure is reversed.

The embodiments of the invention in which an exclusive property or privilege is claimed are defined as follows:

1. In a bag house including a plenum having an apertured filter bag support plate and at least one row of filter bags, each of said filter bags having a first end affixed to the plate in flow through communication with the plenum through a plate aperture and a free second end, the improvement comprising:

a docking pin projecting from the second end of each filter bag;

a gathering member and a retaining member rotatably supported within the bag house proximate said second ends of said filter bags in said row of bags;

said gathering member including a plurality of generally adjacent guide portions, each of said guide portions corresponding to one of the bags and being operatively associated with its respective docking pin to guide the bag into alignment within the bag house upon predetermined rotation of the gathering member; and said retaining member extending generally parallel to said gathering member and cooperating with each of said guide portions of align and entrap the respective docking pins within said guide portions upon subsequent rotation of said retaining member into a preselected bag anchoring position.

2. The improvement according to claim 1, and including filter support means disposed within and extending throughout substantially the length of each bag; and the respective docking pin associated with each bag being affixed to said support means.

3. The improvement according to claim 2, and including a compression clamp gathering the second end of each bag about its respective docking pin in dust-tight sealing relation.

4. The improvement according to claim 2, wherein each of said filter support means comprises an elongated tubular basket generally contiguous with the interior of its respective filter bag and having one end adapted to be secured to the support plate of the housing.

5. The improvement according to claim 1, and including locking means releasably securing said gathering and retaining members in the bag anchoring position.

6. The improvement according to claim 1, wherein each of said guide portions is a V-shaped notch.

7. The improvement according to claim 6, wherein said gathering member is a rod of an elongated zigzag configuration providing said V-shaped notches.

8. The improvement according to claim 1, and including first bearing means carrying said gathering member for rotation within the bag house; and second bearing means spaced from said first bearing means carrying said retaining member for rotation about an axis extending generally parallel to and spaced from the rotational axis of the gathering member.

9. The improvement according to claim 8, wherein said gathering member includes opposite end sections journaled within said first bearing means and a zigzagged intermediate section providing said guide portions; and said retaining member includes opposite end portions journaled within said second bearing means and a connecting bar portion offset from the rotational axis of the retaining member sized to cooperate with said guide portions.

* * * * *

UNITED STATES PATENT AND TRADEMARK OFFICE
CERTIFICATE OF CORRECTION

PATENT NO. : 4,306,896
DATED : December 22, 1981
INVENTOR(S) : Leonard J. O'Dell It is certified that error appears in the above—identified patent and that said Letters Patent is hereby corrected as shown below:

Claim 1, Column 4, line 10, "of" should read -- to --.

Signed and Sealed this

Sixteenth Day of March 1982

[SEAL]

Attest:

Attesting Officer

GERALD J. MOSSINGHOFF

Commissioner of Patents and Trademarks